UNITED STATES PATENT OFFICE.

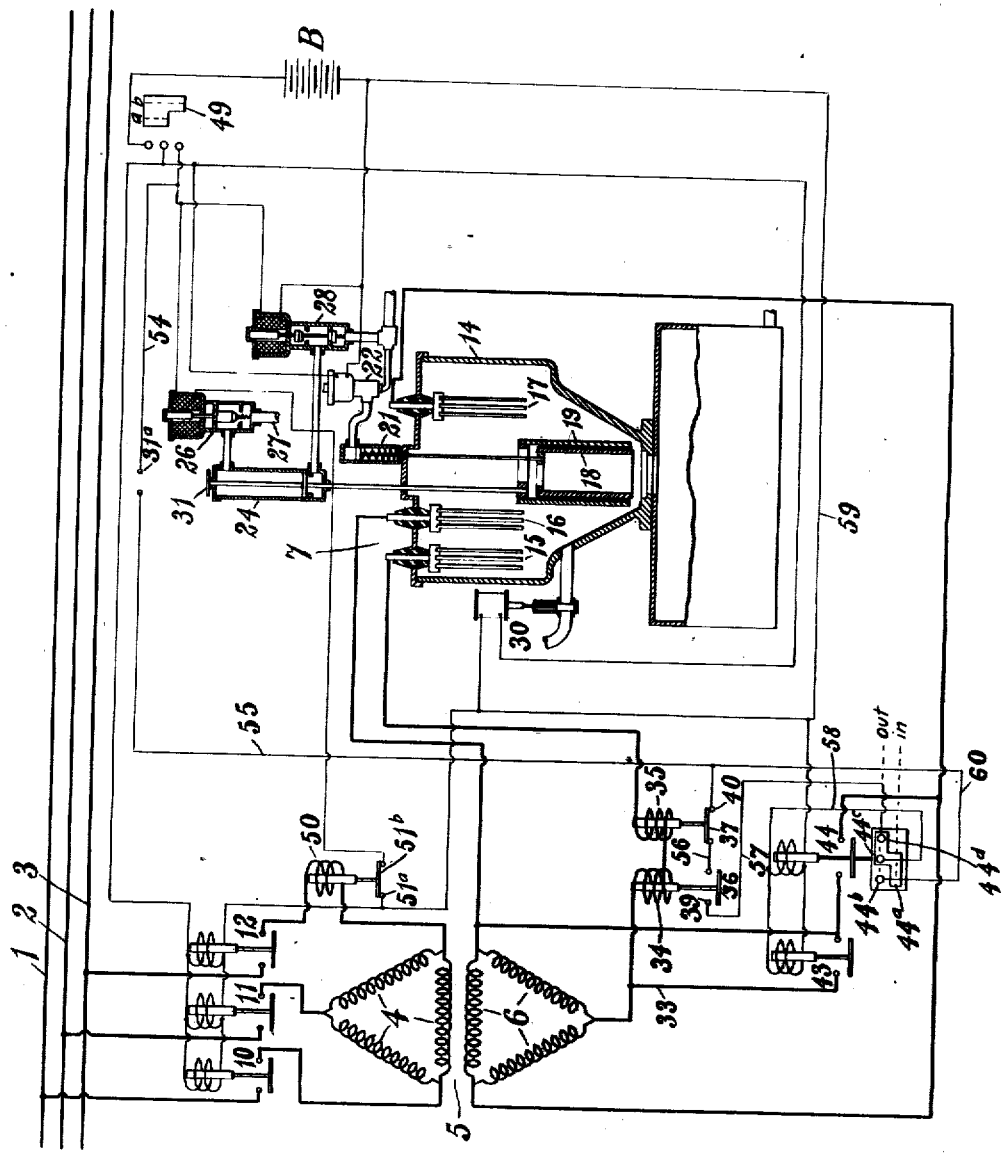

KARL A. SIMMON AND ARTHUR J. HALL, OF WILKINSBURG, PENNSYLVANIA, ASSIGNORS TO WESTINGHOUSE ELECTRIC AND MANUFACTURING COMPANY, A CORPORATION OF PENNSYLVANIA.

CONTROL SYSTEM.

1,241,567.      Specification of Letters Patent.      Patented Oct. 2, 1917.

Application filed April 6, 1914. Serial No. 830,098.

*To all whom it may concern:*

Be it known that we, KARL A. SIMMON, a citizen of the United States, and a resident of Wilkinsburg, in the county of Allegheny and State of Pennsylvania, and ARTHUR J. HALL, a subject of the King of Great Britain, and a resident of Wilkinsburg, in the county of Allegheny and State of Pennsylvania, have invented a new and useful Improvement in Control Systems, of which the following is a specification.

Our invention relates to control systems, and it has special reference to systems of the type adapted to govern the operation of polyphase induction motors through the agency of liquid rheostats.

One of the objects of our invention is to simplify and improve the operation and arrangement of circuits of a system of the above-indicated class and to provide effective and reliable means for short-circuiting the rheostat under predetermined conditions.

Another object of our invention is to provide a plurality of electrically operated switches for short-circuiting a liquid rheostat having a movable regulating valve for fixing the level of the electrolyte, and to make provision for closing said switches under predetermined current conditions only when the rheostat contains electrolyte and when the regulating valve occupies a predetermined position.

More specifically, the object of our invention is to provide a plurality of series relays which are traversed by current passing through the rheostat and are adapted to act conjointly with an auxiliary switching device associated with the rheostat regulating valve for effecting the closure of a plurality of short-circuiting switches, only when the regulating valve occupies its upper position, when electrolyte is contained within the rheostat, and when the current traversing the rheostat is less than a predetermined amount.

In our co-pending application, Serial No. 830,096, filed of even date herewith, we have shown and described a control system of the general character herein set forth, which embodies a plurality of short-circuiting switches that are operated when the rheostat regulating valve occupies its upper position.

With such a system, there is no assurance that the rheostat will be filled with electrolyte, even though the regulating valve is at its upper limit of travel, for the reason that, having initiated the automatic operation of the regulating valve, its movement will continue until the current traversing the rheostat and the current relay exceeds a predetermined amount. It is evident, therefore, that after once starting the automatic apparatus into action, the regulatable valve will be raised to its upper position, irrespective of whether or not the electrolyte supply system is operating properly.

Furthermore, there is a possibility that the short-circuiting switches would be closed under extremely severe operating conditions and excessive load, which would, of course, be undesirable.

It is the purpose of our present invention to overcome the difficulties hereinbefore mentioned and to provide adequate means for effecting reliable and safe operation.

Our invention may best be understood by reference to the accompanying drawing, the single figure of which is a diagrammatic view of a system of control embodying our invention.

Referring to the drawing, the system shown comprises a plurality of supply-circuit conductors 1, 2 and 3 which are adapted to supply polyphase alternating current energy to primary windings 4 of an induction motor 5, the secondary windings 6 of which are connected to a liquid rheostat 7 which is adapted to govern the operation thereof. A plurality of electrically operated line switches 10, 11 and 12 are interposed between the supply circuit conductors 1, 2 and 3 and the primary windings 4 of the motor 5, and are adapted to establish connections between them.

The liquid rheostat 7 comprises a containing tank 14 having a plurality of sets of coöperating electrodes 15, 16 and 17, a movable discharge valve 18, and a movable regulating valve 19 for fixing the height of the electrolyte within the rheostat in the same general manner as set forth in the co-pending application hereinbefore referred to. The discharge valve 18 is actuated by a pneumatic device 21 of well-known construction, the operation of which is governed by an electrically controlled valve 22. A pneumatically operated device 24 is associated with the regulating valve 19 and is adapted to effect its actuation. The device 24 is provided at its upper end with an electrically controlled valve 26 which is normally adapted to admit operating fluid from a suitable supply pipe 27 to the device 24, whereas its lower end is provided with an electrically controlled valve 28 which is normally closed and establishes a communication between the device 24 and the atmosphere.

This brief description of the operating mechanism of the liquid rheostat is deemed sufficient for present purposes, inasmuch as a full exposition thereof may be found by reference to the co-pending application already referred to.

The rheostat 7 is further provided with an electrically operated inlet valve 30 for governing the admission of electrolyte thereto, while an auxiliary interlocking switch 31 is associated with the operating device 24 and is adapted to be closed upon its coöperating terminals 31ª when said regulating valve occupies its upper position.

Interposed in a conductor 33 between the secondary windings 6 of the induction motor 5 and the liquid rheostat 7, are a plurality of series relays or coils 34 and 35 which are respectively provided with movable switch members 36 and 37. The series relay 34 is so designed that, under no-load conditions, its associated switch member 36 is disengaged from its coöperating stationary contact terminals 39, while the switch member 37 of the series relay 35 rests upon and engages its coöperating contact terminals 40, under similar conditions. The auxiliary interlocking switch 31 associated with the operating device 24, and the coöperating switch members of the series relays 34 and 35 act in conjunction to control the energizing circuit of a plurality of switches 43 and 44 which are adapted to establish short-circuit connections across the liquid rheostat.

The short-circuit switch 44 is provided with a movable interlocking switch segment 44ª which is adapted to coöperatively engage a plurality of stationary contact terminals 44ᵇ, 44ᶜ and 44ᵈ. The switch segment 44ª is adapted to occupy two positions, one marked "Out" which corresponds to the position of the short-circuit switch 44 when it is deënergized, and the other marked "In" which corresponds to the closed position of the switch 44.

A master controller 49 is provided for governing the control circuits of the several electrically actuated devices, while a limit switch 50 is connected in circuit between the supply circuit conductor 3 and the primary windings 4 of the induction motor 5 and serves to effect an automatic operation of the rheostat 7.

Assuming the various circuit connections and apparatus to be as shown, the operation of the system is as follows: The master controller 49 is first moved to its position a, thereby completing a circuit from the positive terminal of a battery B, or other suitable source of energy, which includes the following apparatus, the several conductors being omitted for simplification:—master controller 49, where the circuit divides, one branch traversing the energizing coils of the several line switches 10, 11 and 12, and thence to the negative terminal of the battery, another branch including the energizing coil of the electrically controlled discharge valve magnet 22 and thence to the negative terminal of the battery, and another branch including the energizing coil of the inlet valve 30 to the negative terminal of the battery.

Thereupon, the line switches 10, 11 and 12 are closed to connect the motor 5 to the supply circuit conductors 1, 2 and 3, while the discharge valve 18 is closed and the inlet valve 30 is opened. Thus, electrolyte is permitted to fill the rheostat 7 up to a level corresponding to the upper end of the regulating valve 19, as will be understood. At this level, the electrodes 17 are slightly immersed and, hence, the motor 5 is started into operation.

In order to bring the motor up to speed, the master controller 49 is moved to its second position b, in which a circuit is completed from the master controller 49 through the energizing coil of the electrically controlled valve 28 to the battery, while another circuit traverses the energizing coil of the electrically operated valve 26, and coöperating switch members 51 and 51ª of the limit switch 50 to the battery.

Upon the completion of the circuits just recited, the valve 28 is opened to admit operating fluid to the lower end of the pneumatically operating device 24, while the valve 26 is closed to cut off the operating fluid and permit its escape to the atmosphere. Under these conditions, the operating device 24 moves the regulating valve 19 in an upward direction and thus permits a rise in the level of the electrolyte within the rheostat 7. The operation of the device 24 and its associated regulating valve 19 is controlled automatically by the current-limit switch 50 which deënergizes the valve 26 whenever the motor current exceeds a predetermined value, as will be readily understood.

Without further description of the automatic operation, which is similar, in a general way, to many systems of the prior art, we shall assume that the regulating valve 19 has been raised to its upper position, in which the interlocking switch 31 engages its stationary contact terminals 31ª. If, under these conditions, current traverses the liquid rheostat 7, which can only be done when it contains electrolyte, the relay 34 is raised to effect coöperative engagement of its switch members 36 and 39, and if the current does not exceed a predetermined safe value for which the relay 35 is designed, coöperative engagement of its switch members 37 and 40 will be effected.

Since our invention pertains directly to this portion of the system, we will set forth the circuit connections in detail. Under the conditions just described, a circuit will be completed from the master controller 49 through conductor 54, coöperating interlock switch members 31 and 31ª, conductor 55, coöperating switch members 37 and 40 of the relay 35, conductor 56, coöperating switch members 36 and 39 of the relay 34, conductor 57, coöperating contact terminals 44ᵈ and 44ᶜ—which are bridged by the switch segment 44ª—by reason of the open position of the short-circuit switch 44, conductor 58, energizing coils of the short-circuit switches 43 and 44 and conductor 59 to the negative terminal of the battery B. The short-circuit switches 43 and 44 are, therefore, closed, and, in so doing, the interlock switch member 44ª, associated with the short-circuit switch 44, transfers the energizing circuit from stationary contact terminal 44ᵈ to stationary contact terminal 44ᵇ, which is connected to a holding circuit 60. Thus, after the short-circuit switches 43 and 44 are once closed, they are held in that position, irrespective of any subsequent action of the relays 34 and 35, and may be deënergized only by the lowering of the regulating valve 19 and the separation of interlock contact members 31 and 31ª.

In order to bring forth more clearly the functions of the relays 34 and 35, we desire to point out the possibility of an upward movement of the regulating valve 19 to its extreme position, even though the electrolyte circulating system be disabled and no electrolyte be admitted to the rheostat 7. It is, therefore, necessary to make provision against such a contingency which would otherwise result in short-circuiting the motor secondary windings 6 before any resistance had been excluded.

Furthermore, even though the electrolyte circulating system be operating properly and the regulating valve 19 occupies its upper position, it is possible that an extremely excessive current be traversing the rheostat, because of abnormal load or line conditions, which would render it undesirable to close the short-circuiting switches. Therefore, the relay 35 is provided which acts conjointly with the relay 34 and interlocking switch 31 to permit the closure of the short-circuiting switches only when the current is within a predetermined safe value.

By interlocking the short-circuiting switches in the manner hereinbefore described, the driving motor is thoroughly protected against misuse and injurious load conditions.

Modifications, of course, may be made in the arrangement of circuits and location of apparatus without departing from the spirit and scope of my invention, and such modifications are intended to be covered by the appended claims.

We claim as our invention:

1. The combination with translating means, a liquid rheostat having coöperating electrodes, means for admitting electrolyte into said rheostat, and means for short-circuiting said rheostat, of means for preventing the operation of said short-circuiting means until said rheostat is filled with electrolyte and predetermined current conditions of said translating means are established.

2. The combination with a liquid rheostat having coöperating electrodes, means for admitting electrolyte into said rheostat, and means for short-circuiting said rheostat, of means dependent upon predetermined conditions of said rheostat and predetermined current conditions for governing the operation of said short-circuiting means.

3. The combination with a liquid rheostat having coöperating electrodes, means for admitting electrolyte into said rheostat, and means for short-circuiting said rheostat, of means dependent upon electrolyte in said rheostat and upon the current traversing said rheostat for governing the operation of said short-circuiting means.

4. The combination with a liquid rheostat having coöperating electrodes, means for admitting electrolyte into said rheostat, and means for short-circuiting said rheostat, of a plurality of relays severally dependent upon the current traversing said rheostat for acting concurrently to govern the operation of said short-circuiting means.

5. The combination with a liquid rheostat having coöperating electrodes, means for admitting electrolyte into said rheostat, and means for short-circuiting said rheostat, of a plurality of relays respectively dependent upon different predetermined currents traversing said rheostat for acting concurrently and conjointly to govern the operation of said short-circuiting means.

6. The combination with a liquid rheostat having coöperating electrodes, means for admitting electrolyte into said rheostat, and means for short-circuiting said rheostat, of a plurality of relays respectively dependent upon current traversing said rheostat and upon a predetermined current traversing said rheostat for acting concurrently to govern the operation of said short-circuiting means.

7. The combination with a liquid rheostat having coöperating electrodes, means for causing said rheostat to be filled with electrolyte, and electrically operated switches for short-circuiting said rheostat, of a plurality of relays in circuit with said rheostat and traversed by the rheostat current for conjointly controlling said short-circuiting switches and preventing closure thereof until electrolyte is in said rheostat and the current is less than a predetermined amount.

8. The combination with a liquid rheostat, means for admitting electrolyte into said rheostat, a movable regulating valve for fixing the height of the electrolyte, and short-circuiting switches, of means associated with said regulating valve, and a plurality of relays for permitting closure of said short-circuiting switches only when the regulating valve is in its upper position, electrolyte is in the rheostat and the current traversing said rheostat is less than a predetermined value.

9. The combination with a liquid rheostat, means for admitting electrolyte into said rheostat, a movable regulatable valve for fixing the height of the electrolyte, and electrically operated short-circuiting switches, of automatic means for causing said short-circuiting switches to be closed only when the regulating valve occupies a predetermined position, when electrolyte is in said rheostat and when the current traversing said rheostat is less than a predetermined amount.

10. The combination with a liquid rheostat, means for admitting electrolyte into said rheostat, a movable regulating valve for fixing the height of the electrolyte, and electrically operated short-circuiting switches, of automatic means for closing said short-circuiting switches under predetermined current conditions when electrolyte is in said rheostat and the regulating valve occupies a predetermined position.

11. The combination with a liquid rheostat, means for admitting electrolyte into said rheostat, a movable regulating valve for fixing the height of the electrolyte, and electrically operated short-circuiting switches, of automatic means for closing said short-circuiting switches under predetermined current conditions when electrolyte is in said rheostat and the regulating valve occupies a predetermined position, and means for subsequently causing said short-circuiting switches to be dependent only upon the position of said regulating valve.

12. The combination with a liquid rheostat, and means for short-circuiting said rheostat, of a plurality of unlike devices responsive in different degrees to predetermined rheostatic conditions for acting concurrently to govern the operation of said short-circuiting means.

13. The combination with a liquid rheostat, and means for short-circuiting said rheostat, of a plurality of relays having different settings and severally dependent upon the current traversing said rheostat for acting concurrently to govern the operation of said short-circuiting means.

14. The combination with a liquid rheostat having coöperating electrodes, of means for regulating the depth of immersion of said electrodes, electrically-operated short-circuiting switches for the electrodes, and automatic means for closing said switches under predetermined current conditions when said regulating means occupies a predetermined position.

15. The combination with a liquid rheostat, means for admitting electrolyte into the said rheostat, a movable regulating valve for fixing the height of the electrolyte, and electrically operated short-circuiting switches, of a plurality of relays dependent upon the current traversing said rheostat, one of which effects the engagement of its contact members when current traverses the rheostat, and the other effects the disengagement of its contact members under predetermined circuit conditions, an auxiliary switch associated with said regulating valve and adapted to be closed in predetermined position thereof, and an energizing circuit for said short-circuiting switches interlocked through the contact members of said relays and through said auxiliary switch.

In testimony whereof, we have hereunto subscribed our names this 31st day of March, 1914.

KARL A. SIMMON.
ARTHUR J. HALL.

Witnesses:
C. C. WHITTAKER,
B. B. HINES.